July 22, 1958 H. M. BLINN 2,844,657

MULTIPLED KEY-ENDED TRUNK TERMINATION

Filed May 23, 1955 6 Sheets-Sheet 1

INVENTOR

Herbert M. Blinn

July 22, 1958 H. M. BLINN 2,844,657

MULTIPLED KEY-ENDED TRUNK TERMINATION

Filed May 23, 1955 6 Sheets-Sheet 2

Herbert M Blinn

July 22, 1958 H. M. BLINN 2,844,657

MULTIPLED KEY-ENDED TRUNK TERMINATION

Filed May 23, 1955 6 Sheets-Sheet 3

Herbert M Blinn

July 22, 1958 H. M. BLINN 2,844,657

MULTIPLED KEY-ENDED TRUNK TERMINATION

Filed May 23, 1955 6 Sheets-Sheet 4

Herbert M Blinn

Herbert M Blinn

INTERCEPT CIRCUIT

Herbert M Blinn

United States Patent Office 2,844,657

Patented July 22, 1958

2,844,657

MULTIPLED KEY-ENDED TRUNK TERMINATION

Herbert M. Blinn, Indianapolis, Ind.

Application May 23, 1955, Serial No. 510,402

11 Claims. (Cl. 179—48)

Figures 1, 6:
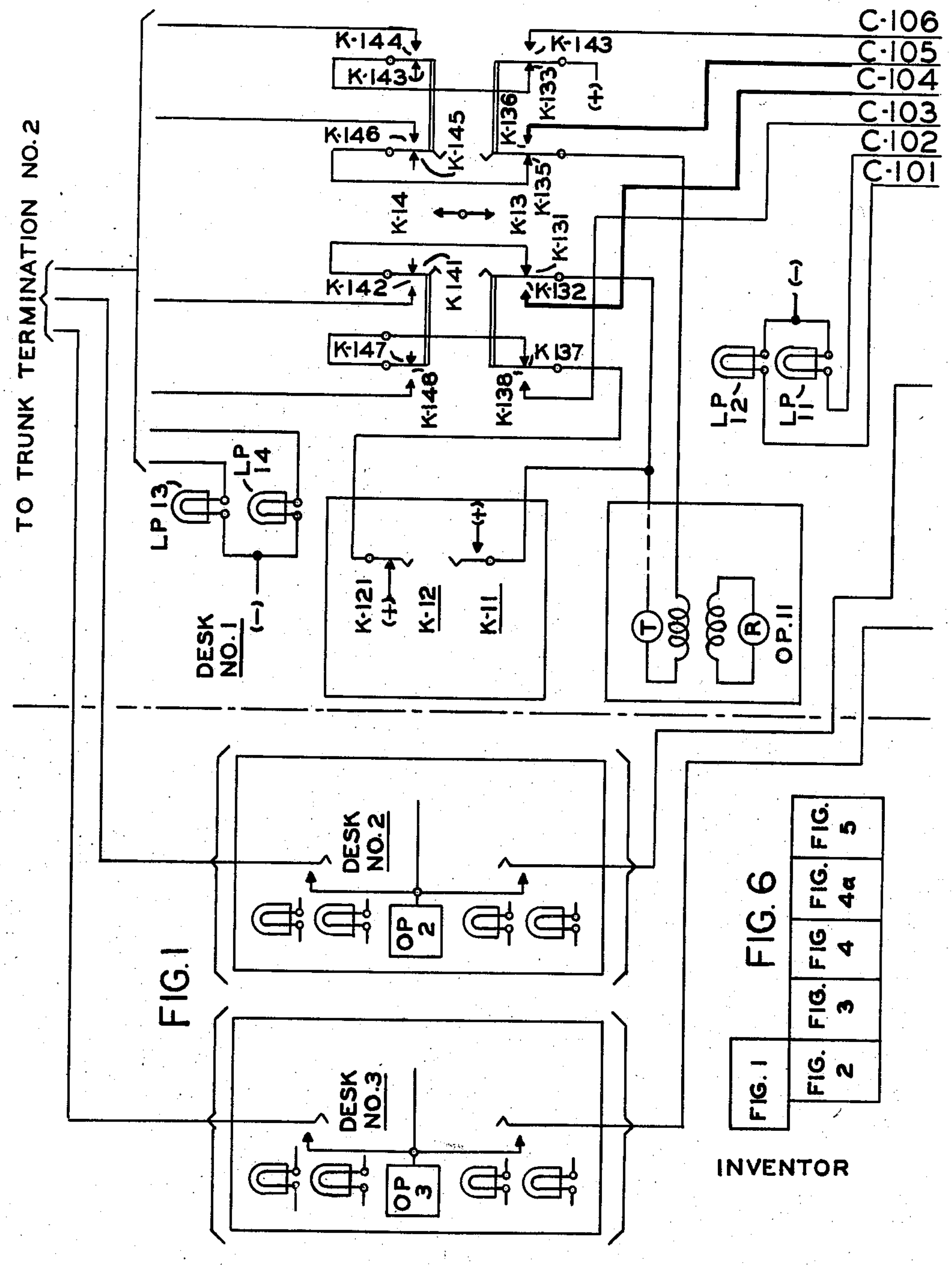

The present invention relates to trunk terminations in general, and more specifically to trunk terminations which have key-ended multiple appearances.

In the past, it has been the practice to terminate trunks in multipled jacks located in the jack field of a multiposition manual switchboard when more than one operator is to have access to a trunk. In such a system, any one of the operators at the switchboard may extend a connection from her telephone to the trunk represented by the selected jack by means of a cord circuit. It is sometimes desirable, particularly when only a few trunks are to be accessible to an operator, to replace the jack with a key so that the operator may extend a connection to a trunk without the use of a cord circuit. The use of such key-ended trunks has been largely confined to non-multiple, single appearance terminations owing to the problem of providing supervisory means operable at the answering appearance only without unduly multiplying the apparatus required at each operator position which arises in the case of multiple key-ended terminations.

Accordingly, it is an object of my invention to provide a new and improved multiple key-ended trunk termination.

It is another object of my invention to provide a new and improved supervisory and holding system suitable for use with a multiple key-ended trunk termination.

I accomplish these and other objects by providing a trunk termination to which connections may be extended from other apparatus, such as a central office. The termination is extended to a plurality of stations, such as intercept desks. Each station includes an operator's telephone, answering means, such as a key associated with the termination completing connections from the telephone to the termination, and signal means, such as an incoming lamp. The termination is equipped with a plurality of relays, each of which is associated with one of the stations and which has contacts in series with the lamp energizing circuit individual to the lamp at the associated station.

In response to an incoming signal over the trunk, means in the termination is operated to complete a common circuit for energizing the lamp energizing circuits and for energizing a circuit for operating all of the relays; as a result, all of the incoming lamp energizing circuits are completed and the incoming lamp at each station is lighted to indicate to all stations that a call is standing in on the trunk.

The operator at any one of the stations may answer such an incoming call by operating the key at her appearance. The connection of an operator's telephone to the termination causes the operation of relay means in the termination which is effective for opening the above described common and operating circuits, thereby extinguishing the incoming signals at all of the stations and deenergizing the operating circuits of the plurality of relays. In order to identify the answering station to the termination so that subsequently transmitted signals from the trunk may be indicated to the answering station only, the one of the plurality of relays which is associated with the answering station is held in operated condition by means comprising a holding circuit which includes contacts on the key at the answering station and which is completed by the operation of the key and the relay associated with the answering station.

Further objects and advantages of my invention will become apparent as the following description proceeds, and the features of novelty which characterize the invention will be pointed out with particularity in the claims annexed to and forming a part of this specification.

Figure 3:
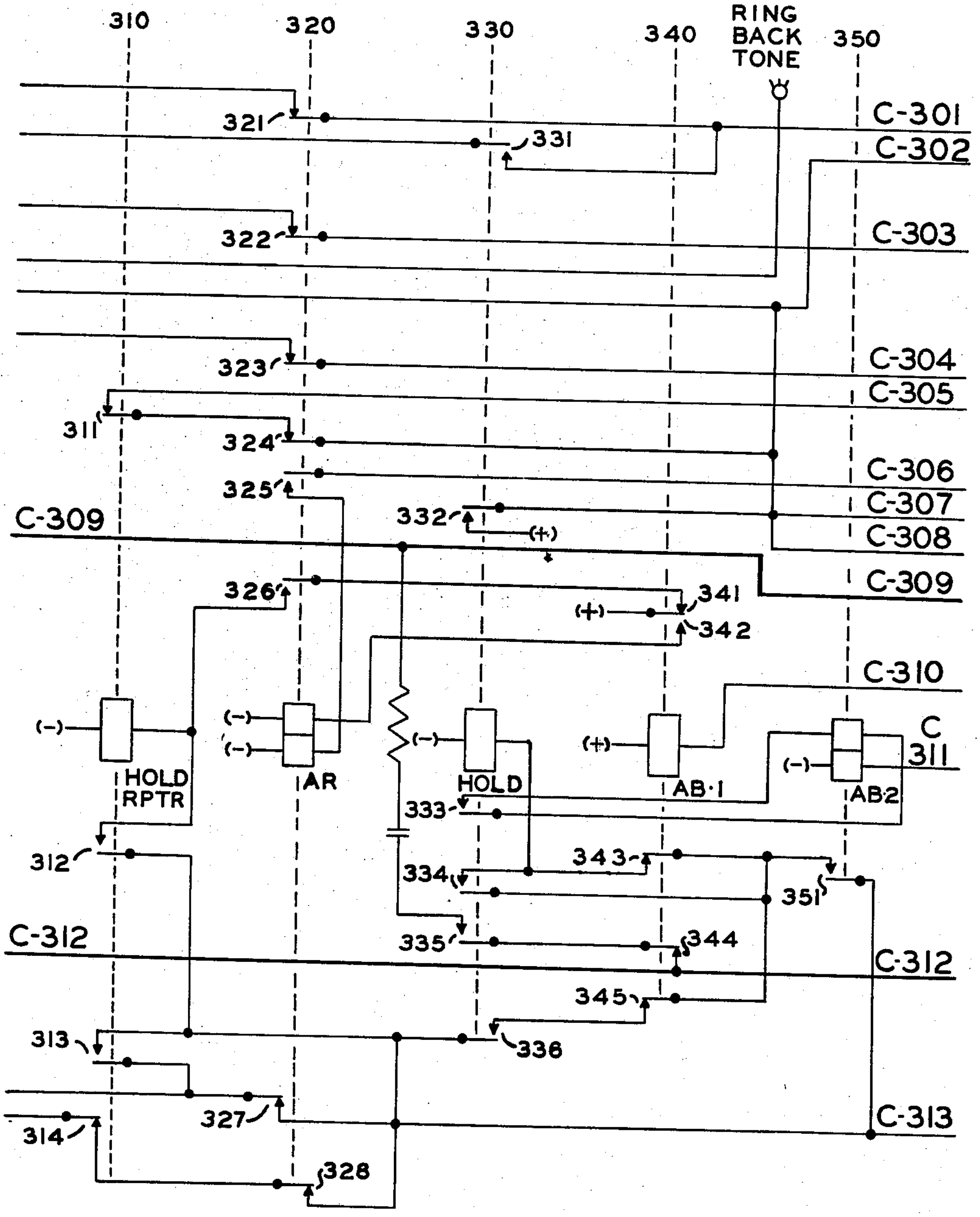
Figure 4:
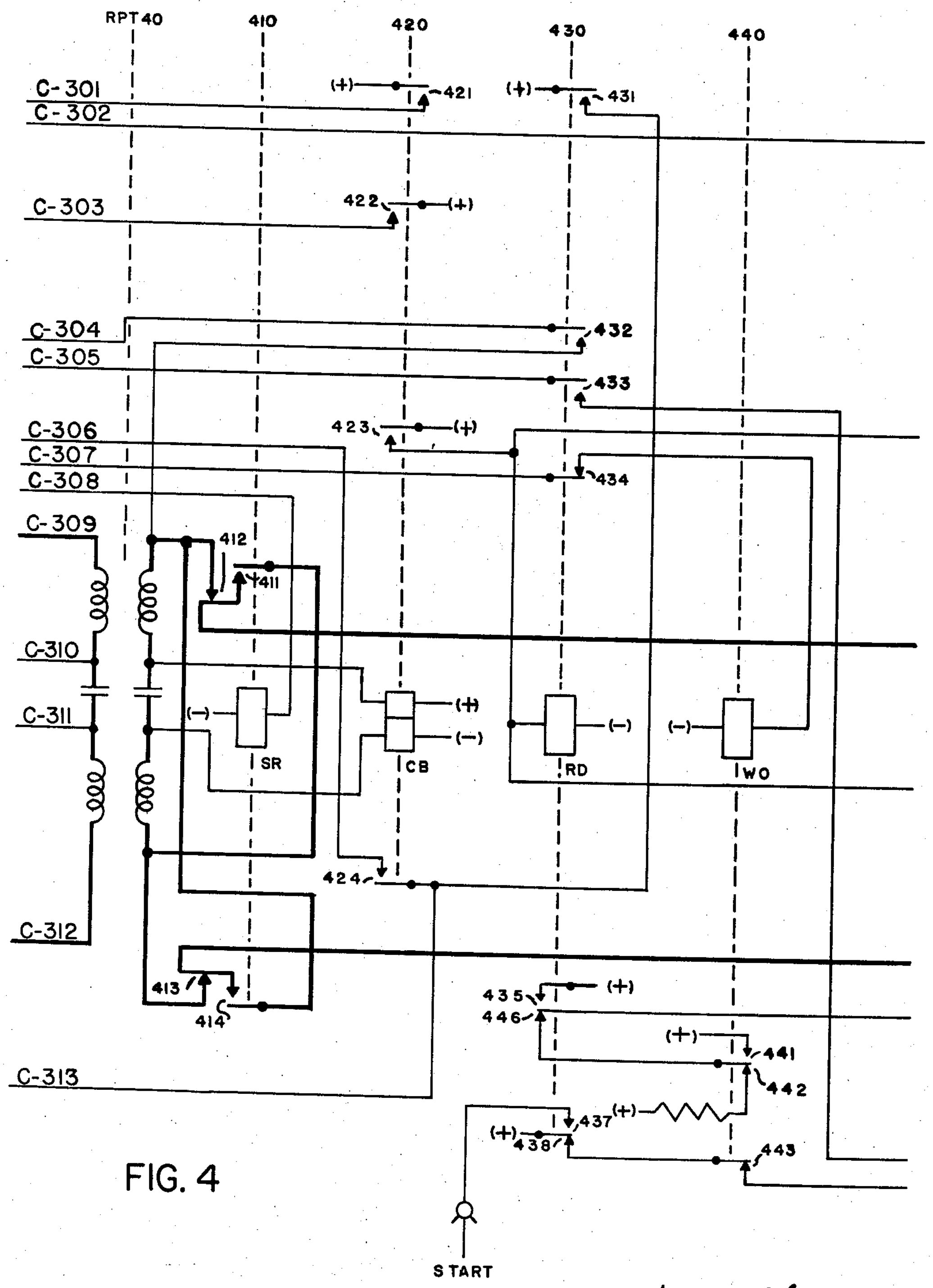
Figure 4A:
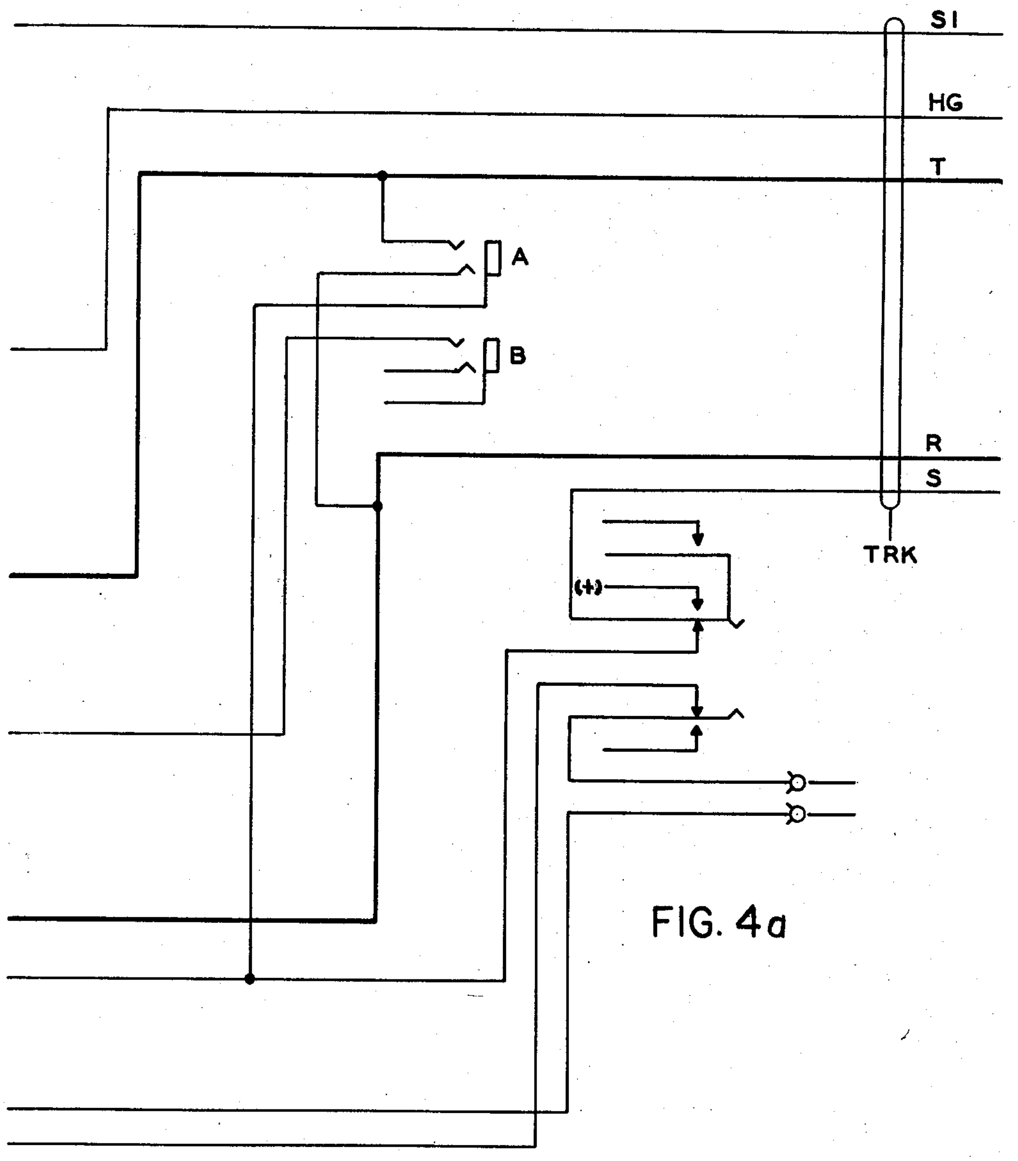
Figure 5:
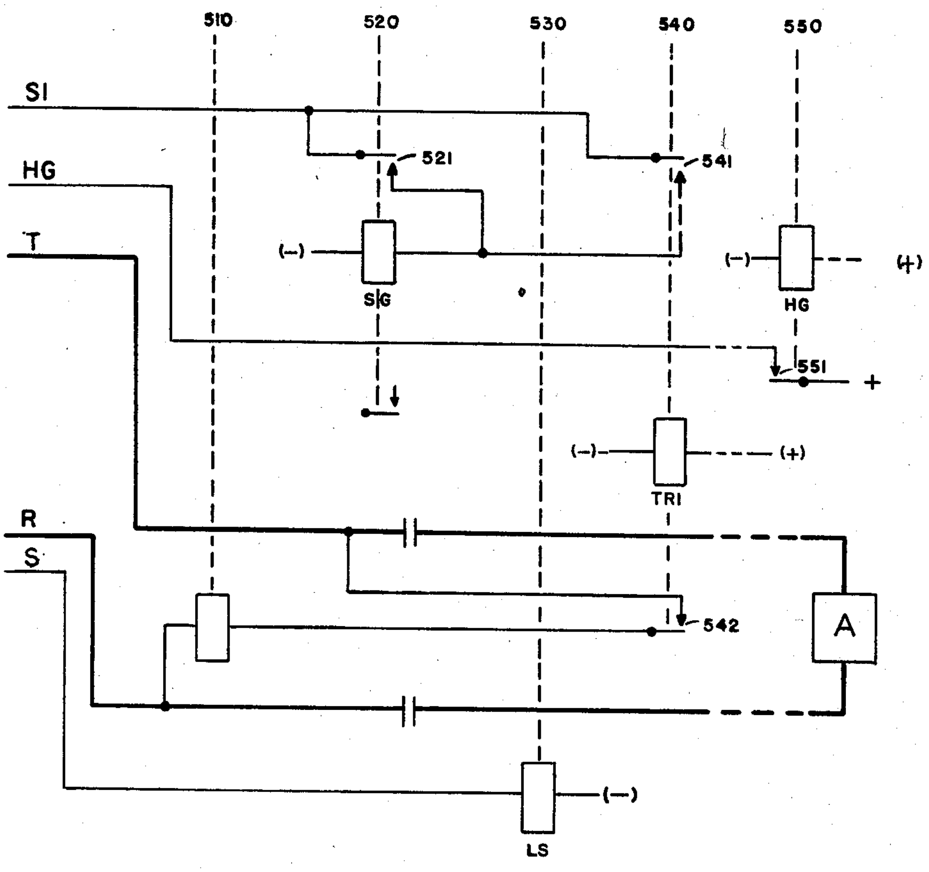

For a better understanding of my invention, reference may be had to the accompanying drawings, in which:

Fig. 1 shows in block form a plurality of stations or desks and the circuit of another station or desk in detail; the stations being suitable for use in an intercept desk;

Figs. 2–4*a* show a termination for a suitable trunk;

Fig. 5 shows in skeletonized form an intercept termination and a call originating station; and Fig. 6 shows the relationship between Figs. 1–5.

The apparatus which forms the embodiment of my invention is made to function from a power source such as a battery. The most positive plate of the battery is connected to ground and is referred to hereafter in the description as "ground" and in the drawings as "(+)"; the most negative ungrounded plate of the battery is referred to in the following description as "battery" and in the drawings as "(−)."

The preferred embodiment of my invention is suitable for use with trunks from an intercept circuit such as the one shown and described in the Kessler Patent 2,605,362 issued July 29, 1952. A skeletonized representation of such an intercept circuit is shown in Fig. 5 of the drawings attached to this description.

Figure 2:
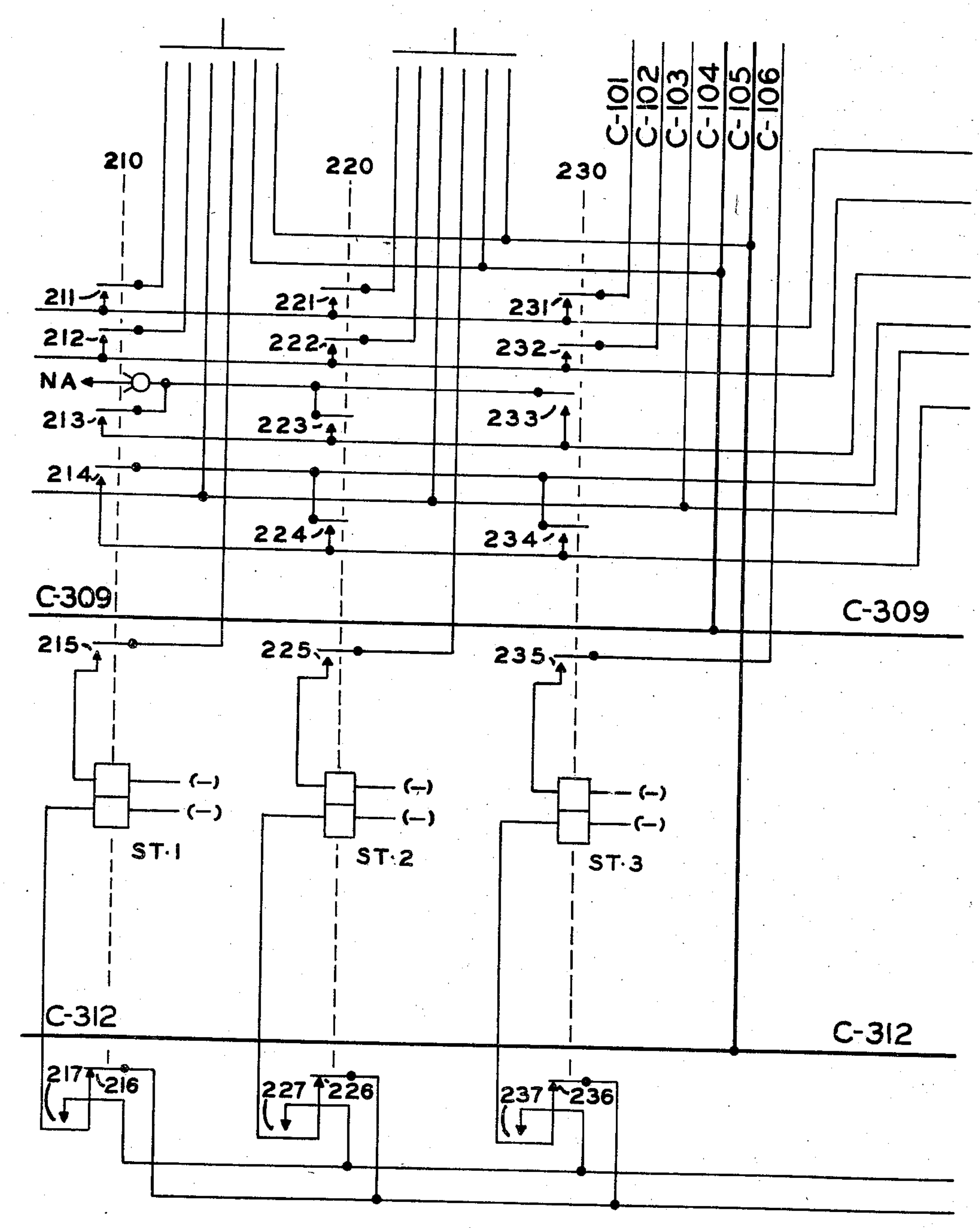

Referring to Fig. 1, several desks or stations have access to the trunk termination shown in Figs. 2–4. Each station is at a separate desk or appearance at which an intercept operator is provided with call answering means comprising a key for extending connections from the operator telephone such as OP–11 to the trunk termination and the incoming trunk, and means comprising lamps for detecting signals transmitted from trunk TRK to the termination shown in Figs. 2–4. Each lamp has an individual energizing circuit connecting the lamp to the termination shown in Figs. 2–4. Conductors, such as C101—C106, connect the termination shown in Figs. 2–4 to each of the stations, such as #1 (Fig. 1). An operator at any one of these stations may answer and thereafter attend to an incoming call from trunk TRK in the manner to be described. In the description which follows, it is assumed that the call is answered at station #1.

Referring to the termination shown in Figs. 2–4, the termination includes a plurality of relays such as 210, 220 and 230; each of the relays is associated with one of the stations and is equipped with contacts for controlling the lamp energizing circuits of the station with which the relay is associated. Thus relay 230 which is associated with desk #1 is effective for controlling the energizing circuits comprising conductors C101 and C102 of signal lamps LP11 and LP12, respectively.

When a call has been extended from a station such as A (Fig. 5) to the intercept circuit by means not shown, other means within the intercept circuit are effective for operating relays 540 and 550 in order to seize trunk TRK and send forward an incoming signal to the intercept operator's trunk termination shown in Figs. 2–4. The operation of relay 540 is effective for operating a first signal responsive means comprising a calling bridge relay 420 in the trunk termination over the following loop: from ground through the upper winding of relay 420, the upper righthand winding of repeat coil RPT–40, break contact 412 on released relay 410, conductor T of the trunk, make contact 542 on now operated relay 540, the winding of relay 510, conductor R of the trunk, break contact 413 on unoperated relay 410, the lower righthand winding of repeat coil RPT–40, the lower winding of relay 420 to battery; relay 420 thereupon operates.

The operation of relay 550 is effective for operating second signal responsive means comprising release delay relay 430 over the following circuit: from ground through make contacts 551 on relay 550, conductors HG, and the winding of relay 430 to battery. The operation of relay 420 is effective to provide an additional holding ground for relay 430 at contacts 423.

The operation of relay 430 is effective for completing an energizing circuit for all of the plurality of station associated relays as follows: from ground through make contact 431, break contacts 328 and 314 on unoperated relays 320 and 310, respectively, break contacts on each of the station associated relays such as 216, 226 and 236, and the lower windings of each of the plurality of relays to battery. Each of the plurality of relays thereupon operates. Contacts on each of the plurality of relays, such as 236 and 237 on relay 230, are effective for transferring the lower winding of each relay from the previously described energizing circuit to the following locking circuit: from ground through make contacts on now operated relay 430, break contact 327, the make contacts 217, 227 and 327 on each of the station associated relays, the lower winding of the station associated relays to battery. The completion of the locking circuit is effective for thereafter holding the station associated relays in operated condition independently of the operation of hold repeater relay 310.

The operation of calling bridge relay 420 is also effective for energizing a circuit common to the plurality of relays and lamp energizing circuits comprising conductor C301 for completing the incoming lamp energizing circuits of all of the stations. Thus, the energization of the common circuit and the operation of relay 230 is effective for energizing the incoming signal lamp of station #1 as follows: from ground through make contacts 421 on now operated relay 420, conductor C301, break contacts 321 on unoperated relay 320, make contacts 231, conductor C101, and the incoming signal lamp LP12 to battery.

In response to the lighting of the incoming lamps, any one of the operators at the various desks may answer the call. In order to answer the call on trunk TRK by establishing a connection between her telephone and the termination at the incoming trunks, the operator at desk #1 cams the key K13, thereby extending a connection from the telephone OP–1 to the talking conductors of the trunk termination C309 and C312 by way of make contacts K132 and K136, respectively, on key K13. A loop circuit is thereby completed for supplying operating current to the transmitter T of telephone OP–1 and for operating means comprising relays 340 and 350 within the termination over the following circuit: from ground through the winding of answering bridge 1 relay 340, the upper lefthand winding of repeat coil RPT–40, conductors C309, conductor C104, make contacts K132 on now operated key K13, the transmitter T of telephone OP–11, the upper winding of transformer TR10, make contacts K136 on now operated key K13, conductor C105, conductor C312, the lower lefthand winding of repeat coil RPT–40, and the lower winding of answering bridge 2 relay 350 to battery. Relays 340 and 350 thereupon operate. The operation of relay 340 is effective for causing other answering responsive means comprising repeater relay 320 to operate by completing a circuit from ground through the now operated make contact 342, and the upper winding of relay 320 to battery. Relay 320 is thereafter held operated so long as the calling station A continues to hold the preceding intercept circuit shown in Fig. 5 and the locking circuit of relay 320 is thus maintained from ground to make contacts 431, 424 and 325 on now operated relays 430, 420 and 320, respectively, the lower winding of relay 320 to battery, or the operation for the upper winding previously described is maintained. Operation of key K13 is also effective or extending a ground to equipment in the preceding intercept circuit which is effective to prevent the release of the intercept circuit as follows: from ground through break contacts K121 on ringing key K12, now operated make contacts K138 on key K13, conductors C103 and C302, make contacts 541 on now operated relay 540, and the winding of relay 520 to battery. Relay 520 thereupon operates and locks up by way of contacts 521, so that relay 520 is held in operated condition independently of the operation of relay 540. The operation of relay 520 is effective to hold the intercept circuit by means not shown.

The operation of relay 320 is effective for deenergizing the incoming signal lamps at all of the stations by disconnecting the incoming lamp energizing circuits from the previously described common circuit at break contacts 321. The operation of relay 320 is also effective for opening the previously described operating and hold circuits of the plurality of relays at break contacts 328 and 327, respectively, in order to bring about the release of the plurality of relays that are to be held operated only from the signal responsive relay 430.

In order to identify the answering station to the trunk termination so that subsequently transmitted supervisory signals from the intercept circuit may be made to operate the supervisory lamp LP11 at station #1 only, it is necessary that relay 230, associated with station #1, remain in operated condition. In order to hold relay 230 in operated condition subsequent to the opening of the hold and operate circuits, other means comprising make contacts K134 associated with the answering key K13 of desk #1 are effective for completing a holding circuit for relay 230 as follows: from ground through make contacts K134, conductor C106, make contacts 235 on now operated relay 230, the upper winding of relay 230 to battery.

In order to allow the operator to disconnect her telephone and thereby withdraw from the previously described connection without causing a supervisory signal to be sent back to the station A, the operator first opeerates key K11 and thereafter releases the answering key K13. Operation of K11 is effective for shorting out the winding of, and thereby releasing, relay 340 by completing a circuit from ground to make contacts K111, make contacts K132, conductors C104 and C309, and the upper lefthand winding of repeat coil RPT–40 to the winding of relay 340 to ground. Relay 350 remains operated at this time. The operation of relay 350 and the release of relay 340 is effective for operating holding means comprising relay 330 over the following circuit: from ground through make contacts 431 and 352 on now operated relays 430 and 350, respectively, break contacts 343 on released relay 340, and the winding of relay 330 to battery. The operation of relay 330 is effective to connect ground to the holding conductor C302 from make contacts 332 in order to hold operated signal relay 520 in its operated condition over the previously described circuit.

The release of relay 340 is also effective for operating other holding means comprising hold repeater relay 310 over the following circuit: from ground through break contacts 341 on now released relay 340, make contacts 326 on operated relay 320, the winding of relay 310 to battery. The operation of relay 310 is effective for preparing an auxiliary holding circuit for the still-operated relay 230 which is associated with desk #1 as follows: from ground through make contacts 431 and 313 on now operated relays 430 and 310, make contacts 237 on relay ST3, the lower winding of relay ST3 to battery, thereby ensuring the continued operation of relay 230 so long as release delay relay 430 is held operated by the continued seized condition of trunk TRK is maintained.

The operation of relay 330 is also effective for connecting the previously described common circuit to the energizing circuit of the supervisory signal lamps of the station from which a hold condition is established. In the case being described here, signal lamp LP11 is energized from ground through make contacts 421, conductor C301, make contacts 331 and 232 on now operated relays 330 and 230, respectively, conductor C102 and lamp LP11 to battery.

When the operator releases the connecting key K13 after the hold key K11 has been operated and relays 310 and 330 have been operated, relay 350 releases, opening the previously described operating circuit of relay 330 at make contacts 352. Relay 330 thereafter remains operated so long as the connection of the station A to the termination shown in Figs. 2–4 is held from ground through make contacts 431 and 336 on operated relays 430 and 330, respectively, break contacts 345 on now released relay 340, make contacts 344 on relay 330, and the winding of relay 330 to battery. With the termination in hold condition, supervisory signals passed forward from the intercept circuit to the termination shown in Figs. 2–4 are effective to control signal lamp LP11 at station #1 only. Such supervisory signals consist of opening and then reclosing the previously described operating circuit of calling bridge relay 420; relay 420 is accordingly released and reoperated by each such signal. The release of relay 420 is effective to open the common circuit at make contacts 421, thereby deenergizing the supervisory lamp LP11 at station #1.

After the trunk termination shown in Figs. 2–4 has been put on hold condition, the telephone OP–1 may be reconnected to the termination and station A by operating key K13 to recomplete the previously described connection between station A and the operator's telephone. The previously described operating circuits of relays 340 and 350 are reestablished so that the operating and holding circuits of relay 330 are opened at break contacts 343 and 345, respectively, of now operated relay 340. Relay 330 thereupon releases to remove the auxiliary holding ground at contact 332 from conductor C302, and to extinguish supervisory lamp LP11 by disconnecting the common circuit from the energizing circuit of lamp LP11 at now opened make contacts 331. The supervisory lamp is thereby prevented from responding to further signals transmitted from station A to the trunk termination shown in Figs. 2–4.

While I have shown and described a specific embodiment of my invention, other modifications will readily occur to those skilled in the art. I do not, therefore, desire my invention to be limited to the specific arrangement shown and described and I intend in the appended claims to cover all modifications within the spirit and scope of my invention.

What is claimed is:

1. In a telephone system, a trunk, a termination for said trunk, a plurality of stations connected to said termination, each of said stations comprising means for answering calls, a plurality of means for detecting signals, a plurality of relays, said relays being individual to said stations for energizing one of said signal detecting means, a circuit for operating said relays, means operative in response to a signal transmitted to said termination from said trunk for completing said circuit, means for opening said circuit, means comprising said answering means of any one of said stations for operating said circuit opening means, and means comprising said any one station answering means for maintaining the one of said relays associated with said any one line in operated condition, whereby all of said signal detecting means are energized in response to a first signal transmitted to said termination and only said signal detecting means energized by the one of said relays associated with said any one station may be energized in response to signals transmitted after the operation of said any one station answering means.

2. In a telephone system, a trunk, a termination for said trunk, a plurality of stations connected to said termination, each of said stations comprising means for answering calls and means for detecting signals, a plurality of relays, said relays being individual to said stations for energizing the corresponding signal detecting means, a circuit for operating said relays, means operative in response to a signal transmitted to said termination from said trunk for completing said circuit, means for opening said circuit, means comprising said answering means of any one of said stations for operating said circuit opening means, a circuit individual to each of said relays for holding the corresponding one of said relays in operated condition, and means comprising said any one station answering means for maintaining said holding circuit of the one of said relays associated with said any one station in operated condition, whereby all of said signal detecting means are operated in response to a first signal transmitted to said termination and only said signal detecting means associated with said any one station may be energized in response to signals transmitted after the operation of said any one station answering means.

3. In a telephone system, a trunk, a termination for said trunk, a plurality of stations connected to said termination, each of said stations comprising means for answering calls and signal lamps, an energizing circuit for each of said lamps, a plurality of relays in said termination, said relays being individual to said stations and operative for completing said lamp energizing circuits of the corresponding said station, a circuit for energizing said relays, means operative in response to a signal transmitted to said termination from said trunk for completing said relay energizing circuit, means for opening said relay energizing circuit, means comprising said answering means of any one of said stations for operating said opening means, a circuit individual to each of said relays for holding the corresponding one of said relays in operated condition, and means comprising said any one station answering means for completing said holding circuit individual to said relay associated with said any one station, whereby said signal lamps of all of said stations are energized in response to an incoming signal over said trunk and only said signal lamps associated with said any one station may respond to signals transmitted subsequent to the operation of said any one station answering means.

4. In a telephone system, a trunk, a termination for said trunk, a plurality of stations connected to said termination, each of said stations comprising means for answering calls and first and second signal lamps, an energizing circuit for each of said lamps, a plurality of relays in said termination, said relays being individual to said stations and operative for completing said lamp energizing circuits of the corresponding one of said plurality of stations, a circuit common to said plurality of relays for supplying energy to said lamp circuits, a first path for operating said relays, means operative in response to a signal transmitted to said termination from said trunk for completing said first path and for connecting said common circuit to said first lamp energizing circuits, means for opening said first path and for disconnecting said common circuit from said first lamp energizing circuits, means comprising said answering means of said any one station for operating said opening means, means individual to each of said relays for thereafter holding the one of said relays associated with said any one station in operated condition over a second path, means comprising said any one station answering means for operating said holding means of said relay associated with said any one station, and other means for thereafter connecting said common circuit to said second lamp energizing circuits, whereby said first signal lamps of all of said stations are energized in response to an incoming signal transmitted over said trunk and only said second signal lamp at said any one station is energized in response to signals transmitted subsequent to the answering of a call by said any one station.

5. The system set forth in claim 4 wherein said other means is effective for establishing a holding circuit for said relay associated with said any one station from said first path, and means at each of said stations operative in response to the operation of said answering responsive means for operating said other means, whereby said second signal lamp at said any one station continues to be responsive to signals transmitted over said trunk subsequent to the deactuation of said answering means of said any one station.

6. In a telephone system, a trunk, a termination for said trunk, a plurality of stations, means comprising a pair of talking conductors for connecting each of said stations to said termination, each of said stations comprising an answering key, a hold key and first and second signal lamps, energizing circuits for each of said signal lamps, a plurality of relays in said termination, said relays including first and second windings and being individual to said stations for completing said lamp energizing circuits of the corresponding station, a circuit for energizing said relays, a circuit common to said plurality of relays for supplying energy to said lamp energizing circuits, means operative in response to a signal transmitted to said termination from said trunk for connecting said relay energizing circuit to said first windings of said relays and said common circuit to said first lamp energizing circuits, a first holding circuit for said relays, contacts on each of said relays for transferring said first windings from said energizing circuit to said first holding circuit, means operative in response to the operation of said answering key of any one of said stations for opening said relay energizing circuit, said first holding circuit and for disconnecting said common circuit from said first lamp energizing circuits, means comprising contacts on said any one station answering key for establishing a second holding circuit to said second winding of said relay associated with said any one station, and a relay for reclosing said first holding circuit of said relay associated with said any one station and for connecting said common circuit to said second lamp energizing circuits, and an energizing circuit comprising contacts on said any one station hold key and one of said any one station talking conductors for operating said reclosing relay, whereby said signal responsive means is operative in response to signals transmitted from said trunk subsequent to the operation of said hold key of said any one station to energize said second lamp of said any one station only.

7. In a telephone system, a trunk termination comprising a first and a second relay, each of said relays comprising an operating winding, a battery having first and second poles connected to said windings of said first and second relays respectively, a telephone, means comprising a pair of talking conductors for connecting said relay windings and said telephone in series with said battery to operate said first and said second relays, means operative in response to the release of said first relay and the operation of said second relay for placing said termination in a holding condition, means for releasing said first relay and holding said second relay operated, and means operative in response to the operation of said holding means for thereafter maintaining said holding means in operated condition.

8. The system set forth in claim 7 and a key comprising contacts in series with said relays and said telephone for controlling the operation of said relays, whereby said relays may be released and said telephone may be disconnected from said termination after said holding means has been operated.

9. The system set forth in claim 7 and means operative in response to the operation of said first relay for rendering said maintaining means ineffective whereby the holding condition is removed from said termination in response to the reoperation of said first relay.

10. The system set forth in claim 7 and having, in addition, a key comprising contacts in series with said relays and said telephone for controlling the operation of said relays to allow the release of said relays and the disconnection of said telephone from said termination, and means operative in response to the operation of said first relay for rendering said maintaining means ineffective, whereby the holding condition is removed from said termination by the reestablishment of the series relationship between the relay windings and said battery.

11. In a telephone system, a trunk termination comprising first and second relays, each of said relays having an operating winding, a battery having first and second poles connected to said windings of said first and said second relays respectively, a station comprising a telephone and first and second keys, said station being connected to said termination by means comprising a pair of talking conductors, a series circuit comprising said talking conductors, said relay windings and said telephone and said battery for operating said relays, means comprising contacts on said first key for completing said series circuit, a circuit comprising contacts on said second key connected to said series circuit between said first key and said telephone for shorting out said first relay winding and for maintaining said second relay operated to release said first relay prior to the release of said second relay, a third relay operative in response to the release of said first relay and the operation of said second relay for placing said termination in a holding condition, a circuit completed in response to the operation of said holding means for maintaining said holding relay in operated condition, and means operative in response to the operation of said first relay for opening said holding circuit, whereby the holding condition may be removed from said termination by the reestablishment of said series circuit by the reoperation of said contacts of said first key.

No references cited.